(12) United States Patent
Lin et al.

(10) Patent No.: US 6,584,250 B2
(45) Date of Patent: Jun. 24, 2003

(54) OPTICAL FIBER ALIGNMENT ELEMENT USING INTEGRATED MICRO BALL LENS

(75) Inventors: Yuh-Sheng Lin, Hsinchu (TW);
Cheng-Chun Huang, Miaoli Hsien (TW); Ming-Yueh Liu, Taipei (TW);
Jauh-Jung Yang, Taipei (TW);
Chuan-Kang Mu, Taichung (TW);
Ya-Ru Huang, Taipei Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 6 days.

(21) Appl. No.: 09/785,289

(22) Filed: Feb. 20, 2001

(65) Prior Publication Data

US 2002/0114578 A1 Aug. 22, 2002

(51) Int. Cl.[7] .................................................. G02B 6/26
(52) U.S. Cl. ....................................................... 385/52
(58) Field of Search .............................. 385/33, 34, 35, 385/50, 51, 52, 65, 83

(56) References Cited

U.S. PATENT DOCUMENTS

| | | | | |
|---|---|---|---|---|
| 4,732,449 A | * | 3/1988 | Fan .............................. | 385/33 |
| 4,781,431 A | * | 11/1988 | Wesson et al. ................. | 385/61 |
| 4,890,895 A | * | 1/1990 | Zavracky et al. .............. | 385/14 |
| 5,123,073 A | * | 6/1992 | Pimpinella .................... | 385/59 |
| 5,446,810 A | * | 8/1995 | Watanabe et al. ............. | 385/22 |
| 5,717,813 A | * | 2/1998 | Harman et al. ............. | 385/147 |
| 5,784,509 A | * | 7/1998 | Yamane et al. ............... | 385/49 |
| 5,940,564 A | * | 8/1999 | Jewell .......................... | 385/93 |
| 6,034,405 A | * | 3/2000 | Brady et al. ................. | 257/432 |
| 6,124,080 A | * | 9/2000 | Mizuta et al. ............... | 430/321 |
| 6,170,297 B1 | * | 1/2001 | Jang et al. .................... | 65/378 |
| 6,233,383 B1 | * | 5/2001 | Artigue et al. ................ | 385/39 |
| 6,316,281 B1 | * | 11/2001 | Lee et al. ..................... | 385/14 |
| 6,363,201 B2 | * | 3/2002 | Sherrer et al. ............. | 385/137 |
| 6,393,171 B2 | * | 5/2002 | Sasaki et al. ................. | 385/14 |

FOREIGN PATENT DOCUMENTS

JP      410319280 A    * 12/1998

* cited by examiner

Primary Examiner—Lynn D. Feild
Assistant Examiner—Thanh-Tam Le
(74) Attorney, Agent, or Firm—Bacon & Thomas, PLLC

(57) ABSTRACT

An optical fiber alignment element using integrated micro ball lens includes a substrate and a plurality of V-shaped grooves or waveguides formed on the substrate by lithography and etching. The substrate surface is coated with a first polymer layer and a high transparency second polymer layer, then is processed through a lithography process and heating process to form at least a base pad and a spherical micro ball lens between the V-shaped grooves or waveguides. Then dispose optical fibers in the V-shaped grooves. And encase an upper cap over the micro ball lens, grooves, and optical fibers or waveguides. Through suitable configuration and positioning of the micro ball lens, grooves or waveguides, the micro ball lens may be aligned precisely between two sides of the optical fibers or waveguides. The process is simpler, more accurate, and may produce the optical fiber alignment element in an integrated and batch fashion.

23 Claims, 8 Drawing Sheets

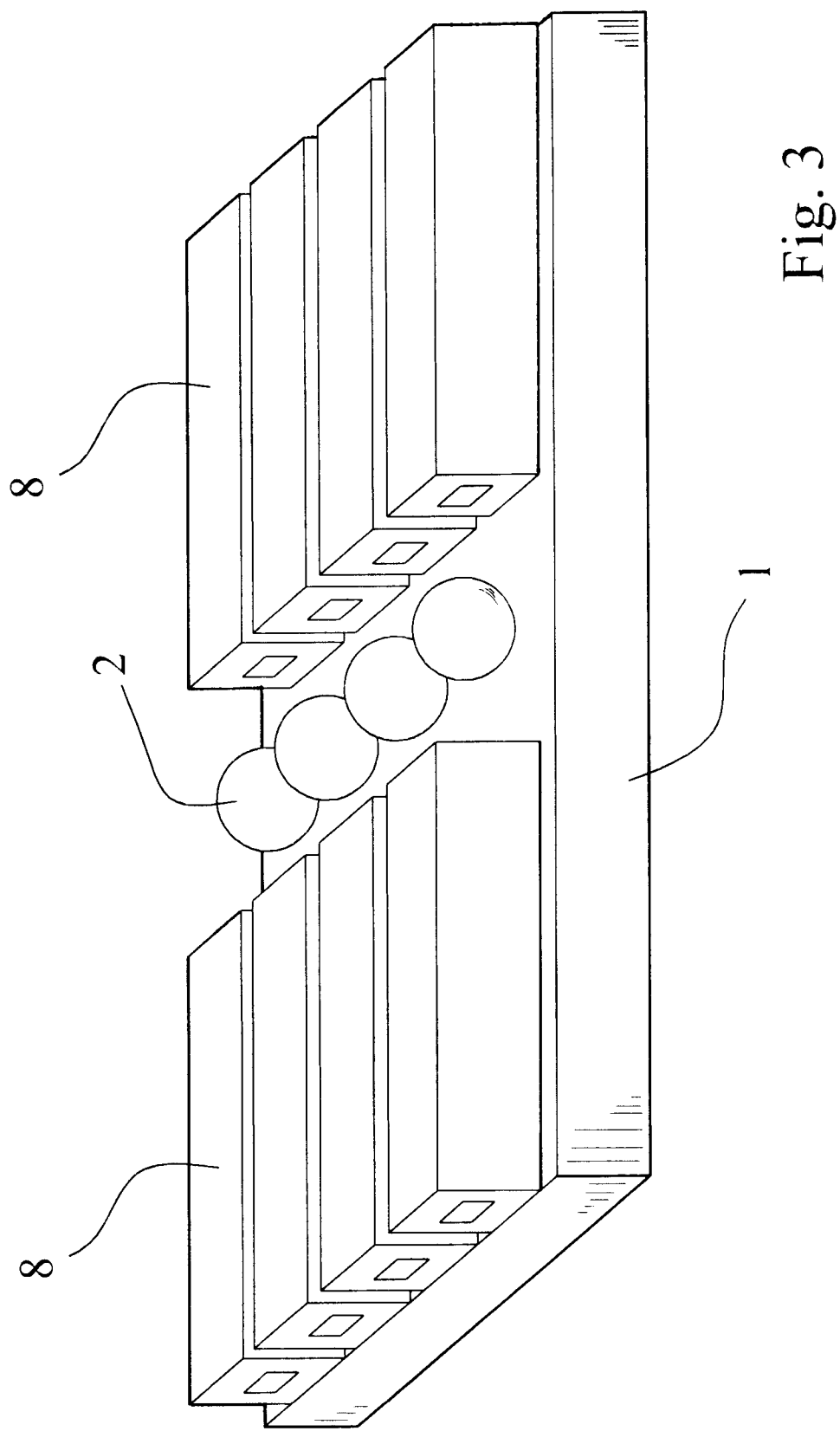

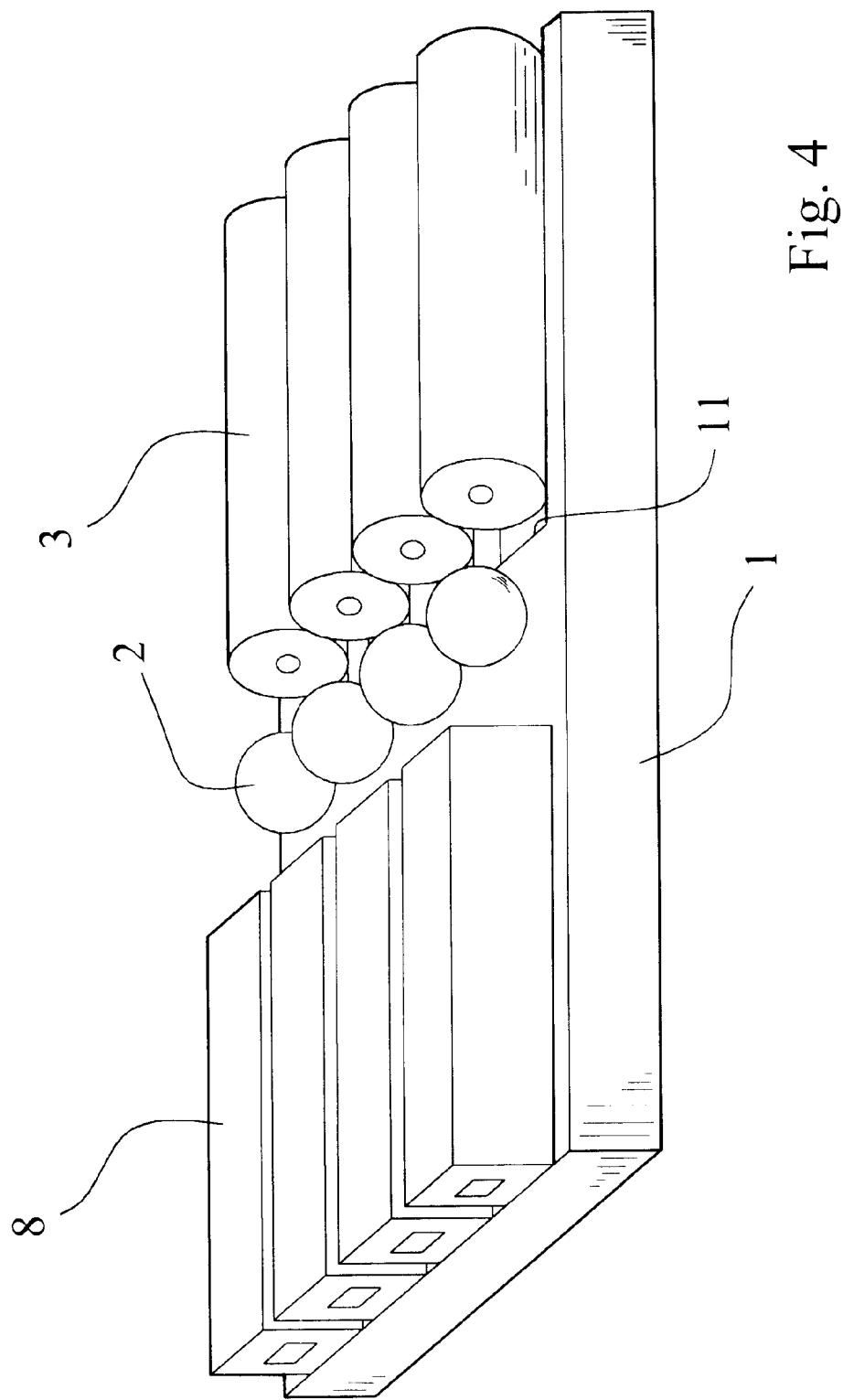

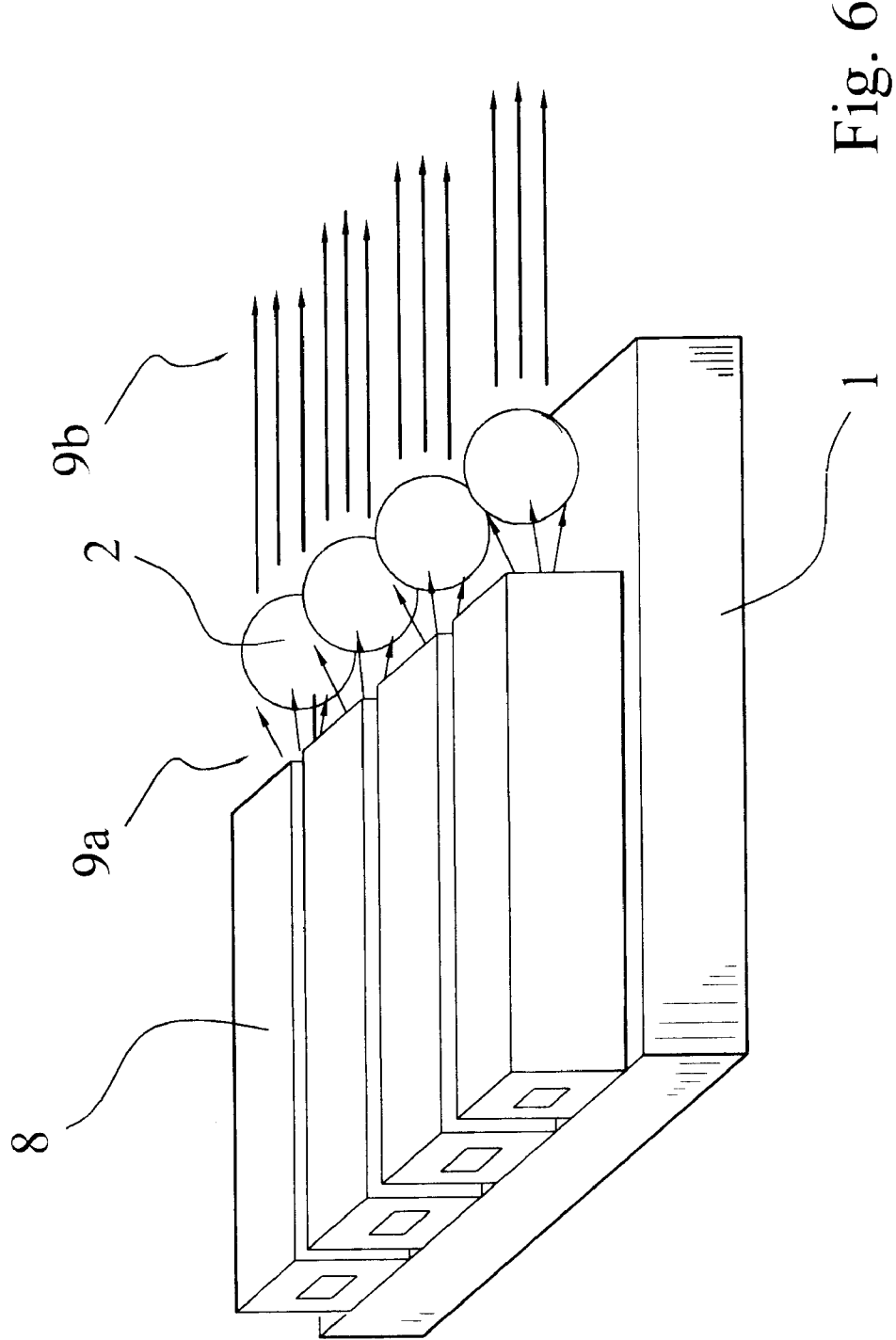

OPTICAL FIBER ALIGNMENT ELEMENT USING INTEGRATED MICRO BALL LENS

BACKGROUND OF THE INVENTION

This invention relates to an optical fiber alignment element structure that employs integrated micro ball lens and particularly a structure that adapts lithography, patternetching and micro machining techniques to fabricate optical elements by forming V-shaped grooves or waveguides and micro ball lenses in batch, then integrate the V-shaped grooves, waveguides and micro ball lenses for completing optical path control of the optical fiber passive elements.

In optical fiber communication, there are a number of techniques being adapted for the alignment of optical fiber passive elements. One is the fused biconical taper technique which aligns two optical fibers directly, then fuses the aligned fibers and stretches the fibers to connect the fiber cores at two ends together under the polymerization force effect. The connection made by this technique tends to cause power loss because the diameters of the coupling optical fibers could be not equal, the alignment of the fibers not precise, or the surfaces of the fiber connection ends not even and smooth.

Another technique is to dispose a gradient index lens (GRIN lens) at one end of an optical fiber for channeling optical signals of the fiber to the GRIN lens. The photo signals are amplified and paralleled to focus on another optical fiber. This technique costs higher and needs human labor to do micro assembly. There is yet another technique which forms a microlens at the end of each optical fiber for converging and focusing light between the coupled fibers to transmit optical signals. This method requires process for every fiber end. Still another technique is to dispose a ball lens between two optical fibers or waveguides. The ball lens focuses light received from a fiber at one side and transmits photo signals to another fiber at another side. The ball lens being used is ground by high precision ceramic means. The fabrication process is complex. Furthermore, the techniques of using GRIN lens or ball lens need human labor to micro assemble the GRIN lens at the end of the optical fibers, or to dispose the ball lens between the coupling fibers. Each pair of coupling fibers needs a GRIN lens or ball lens. They take a lot of process time and cannot be produced in batch. When micro assemble the ball lens between the optical fibers by human labor, it is prone to produce alignment deviation between the fiber center line and ball lens center, and might result in loss of optical signal transmission power. There is still another method which employs surface micro machining technique to produce a lens vertically positioned between the coupling optical fibers. However this method has a higher cost and a more complicated fabrication process.

SUMMARY OF THE INVENTION

It is therefore an object of this invention to provide an improved optical fiber alignment element to resolve aforesaid problems and disadvantages. This invention forms a plurality of V-shaped grooves, waveguides and micro ball lens on a substrate such that the optical fibers or waveguides may be precisely aligned with the micro ball lenses without human labor micro assembly of the micro ball lenses between the optical fibers or waveguides.

Another object of this invention is to employ lithography and patternetching techniques and heating process to form the waveguides, micro ball lens and V-shaped grooves on the surface of the substrate whereby to increase accuracy of alignment between the micro ball lenses and optical fibers or waveguides.

A further object of this invention is to provide a simpler fabrication method to improve manufacturing process.

Yet another object of this invention is to fabricate V-shaped grooves, waveguides and micro ball lenses on a substrate by integrated and batch processes for increasing total production efficiency.

In order to achieve aforesaid objects, this invention includes etching a plurality of V-shaped grooves or micro machining a plurality of waveguides on a substrate surface in an array manner; coating a first polymer layer and a high transparency second polymer layer on the substrate surface; placing the substrate through a lithography process and heating process to form a plurality of base pads and spherical micro ball lenses at selected locations of the substrate surface; disposing optical fibers in the V-shaped grooves; and encasing an upper cap over the micro ball lens and optical fibers or waveguides. Through the foregoing processes, the micro ball lenses and V-shaped grooves or waveguides may be positioned at selected locations for the optical fibers located at two sides of the micro ball lenses to align precisely. The process is simpler, more precise, and may produce the optical fiber alignment element in an integrated and batch fashion.

BRIEF DESCRIPTION OF THE DRAWINGS

The invention, as well as its many advantages, may be further understood by the following detailed description and drawings, in which:

FIG. 3 is a schematic view of a first embodiment of this invention.

FIG. 4 is a schematic view of a second embodiment of this invention.

FIG. 6 is a schematic view of a fourth embodiment of this invention.

DESCRIPTION OF THE PREFERRED EMBODIMENTS

Figure 1A:
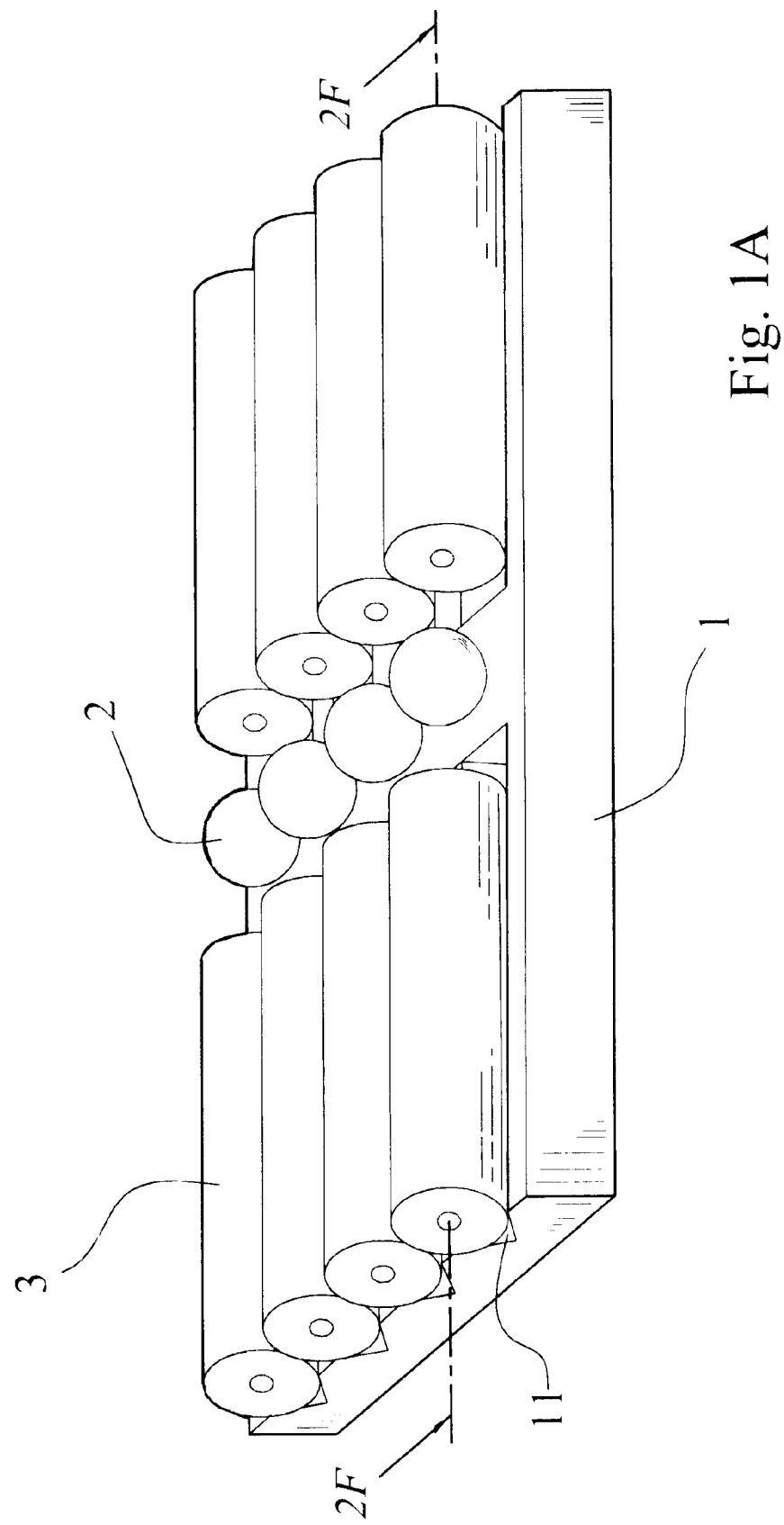
FIG. 1A is a schematic view of the structure of this invention.

Referring to FIG. 1A, the structure according to this invention includes a substrate 1 made from silicon which has a plurality of V-shaped grooves 11 formed thereon in batch. The V-shaped grooves 11 are arranged in a parallel array on the surface of the substrate 1. Every two adjacent grooves are parallel with each other and two arrays of the grooves face each other in an end-to-end manner and being aligned along a straight line. There is a margin formed between the two ends of the grooves and with a plurality of micro ball lenses 2 disposed on the margins. Each micro ball lens 2 faces one end of the two opposite V-shaped grooves 11. Each V-shaped groove 11 has an optical fiber 3 located thereon at a selected position such that the axial center lines of the two opposite fibers 3 are coincided with each other and aligned precisely with the center of the micro ball lens 2 located therebetween.

Figure 1B:
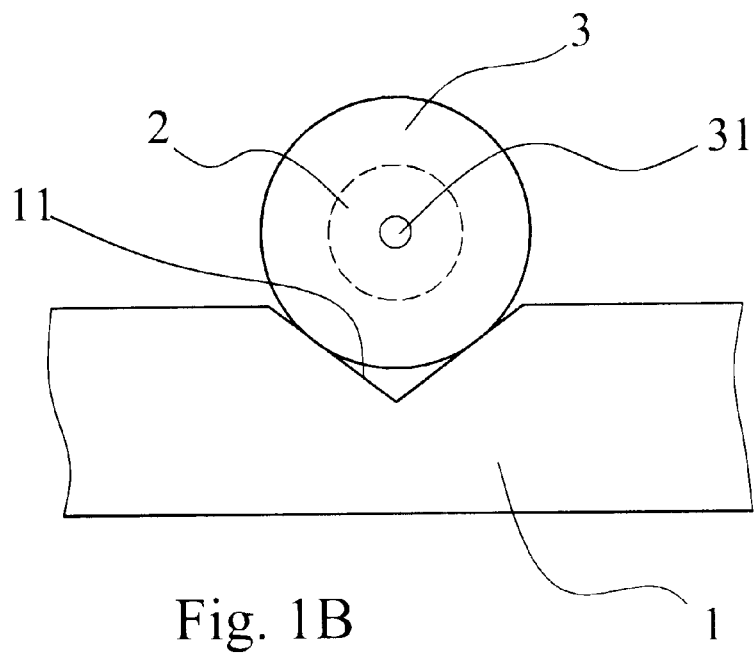
FIGS. 1B and 1C are schematic side views of this invention.
Figure 1C:
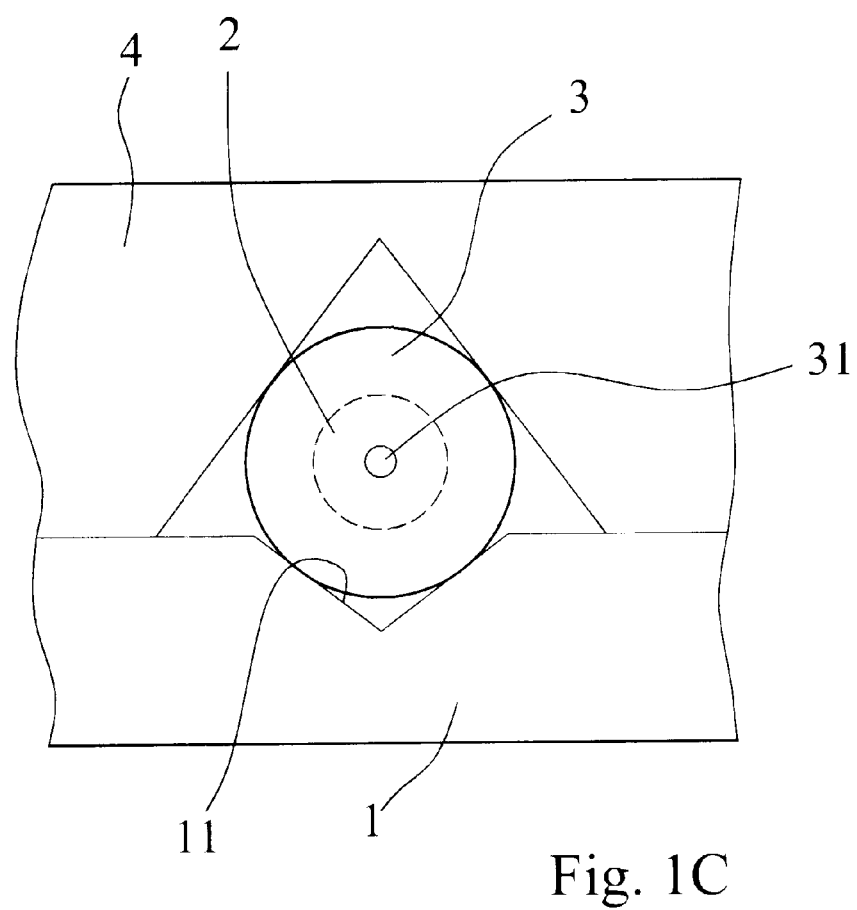
Figure 2A:
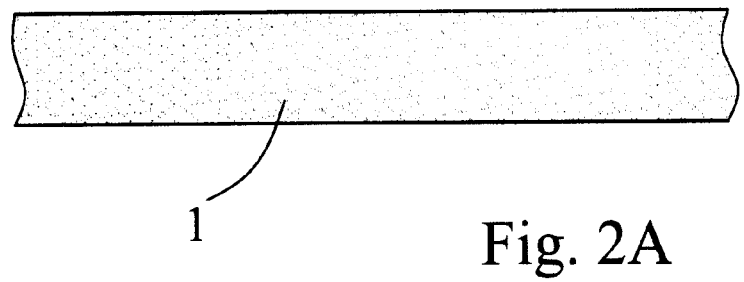
FIGS. 2A through 2G are schematic views of manufacturing process of this invention.
Figure 2B:
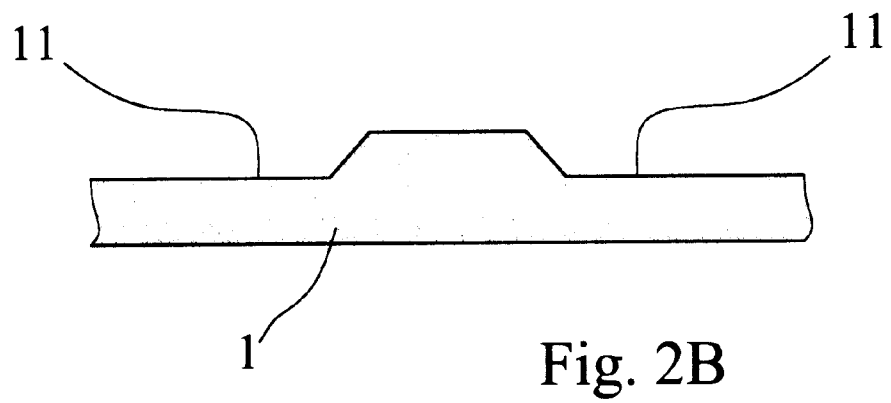
Figure 2C:
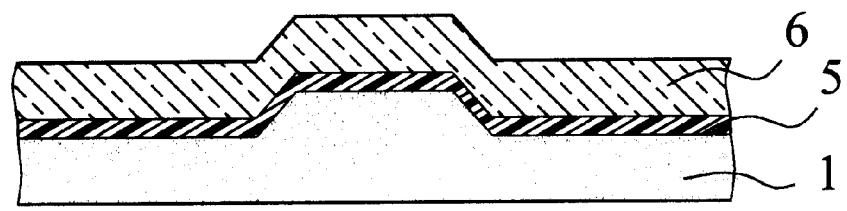
Figure 2D:
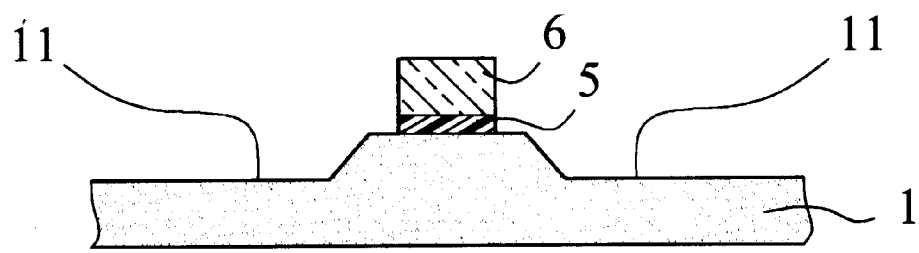
Figure 2E:
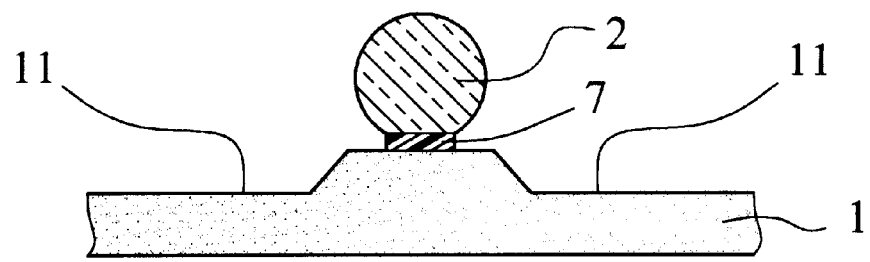
Figure 2F:
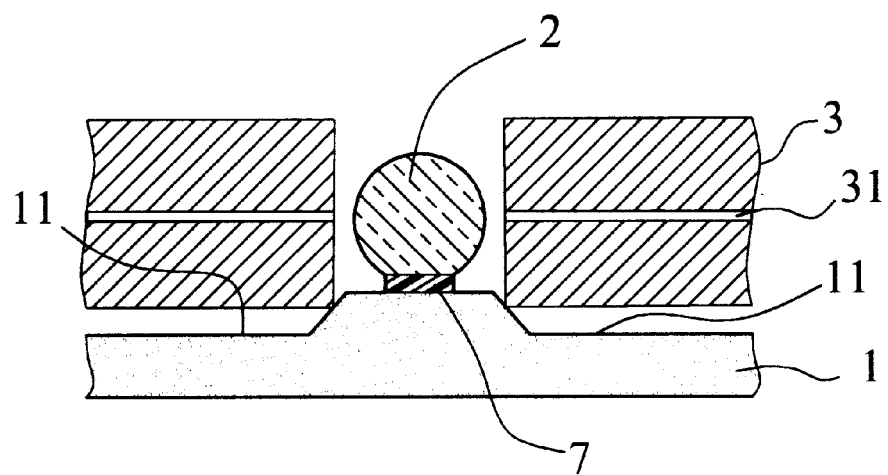
Figure 2G:
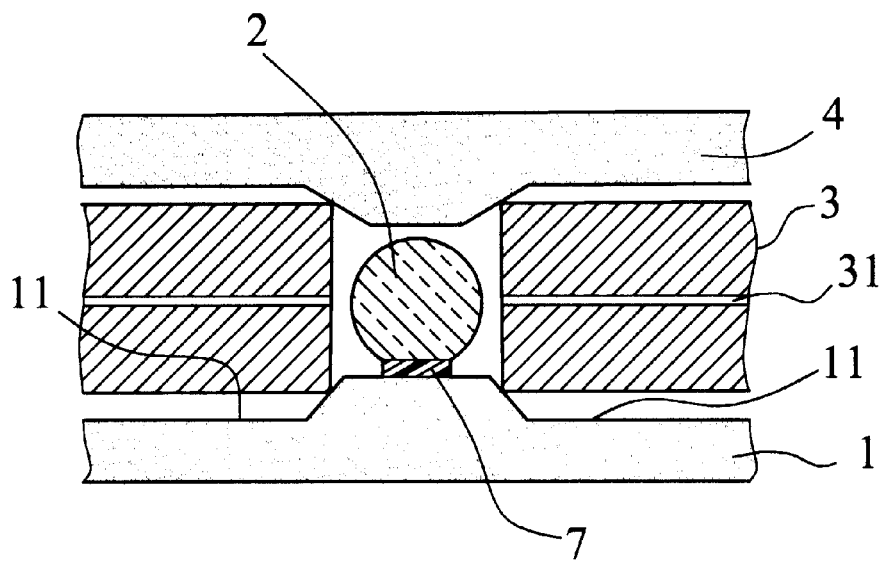

Referring to FIG. 1B, the cross section of the V-shaped groove 11 is a V-shaped recess which has selected angle, size and depth for holding the optical fiber 3 securely without the fiber moving sideward. The V-shaped groove 11 defines the position and direction of the optical fiber 3. The micro ball lens 2 is formed at a selected position such that its perspective center coincides with the core 31 of the optical fiber 3. Referring to FIG. 1C, after the optical fiber 3 is mounted on the V-shaped groove 11, an upper cap 4 is disposed on the top of the substrate 1 to cover the optical fiber 3 and micro ball lens 2 completely and fixedly between the substrate 1 and upper case 4. Hence the optical fiber 3 may transmit optical signals at desired transmission quality without getting interference from outside light sources.

FIGS. 2A through 2G illustrate manufacturing process steps for this invention. First, setup a substrate 1 made from silicon (FIG. 2A); then put the substrate 1 through bulk micro machining to form a plurality of three dimensional V-shaped grooves 11 on the surface of the substrate 1 with selected angle, size and depth, the micro machining may include performing lithography process on substrate surface, using mask aligner or stepper to expose the substrate surface at selected locations, forming selected array patterns on the substrate surface, and etching the substrate surface in an anisotropic fashion with selected etching liquid to etch three dimensional V-shaped grooves 11 with selected angle, size and depth at the positions where the exposed patterns located (FIG. 2B); then coat (by spin coating technique or the like) a layer of photosensitive material made from polyimide on the substrate 1 surface to form a first polymer layer 5, after the first polymer layer 5 is formed, coat a second polymer layer 6 over the first polymer layer 5 with a high polymer material made from polymethacrylate or polyacrylate that has high transparency photoresist and a lower glass transition temperature (Tg) than the first polymer layer 5 (FIG. 2C); perform lithography process on the first polymer layer 5 and second polymer layer 6 to form a plurality of selected patterns on the surface of the substrate 1, the patterns may be circles or ellipses, and make the first polymer layer 5 and second polymer layer 6 stacking like a pillar (FIG. 2D); heat the substrate 1 and the first polymer layer 5 and second polymer layer 6 at a temperature higher than the Tg of the second polymer layer 6 but lower than the Tg of the first polymer layer 5 to soften the second polymer 6 to a molten state such that the fluidity increases and begins to reflow, the first polymer layer 5 has surface contraction under the heat, the second polymer layer 6 becomes a spherical shape under surface tension effect, then cool the substrate 1 and the first polymer layer 5 and second polymer layer 6, and result in the second polymer layer 6 forming a micro ball lens 2 mounted on a base pad 7 formed by the first polymer layer 5 (FIG. 2E); after the micro ball lens 2 and base pad 7 are formed, dispose the optical fibers 3 in the V-shaped grooves 11 at two sides of the micro ball lens 2, because the V-shaped grooves 11 are formed by anisotropic etching with suitable size and depth, the core 31 of the fibers 3 located in the V-shaped grooves 11 will coincide and align precisely with the center of the micro ball lens 2 (FIG. 2F); dispose an upper cap 4 to encase the micro ball lens 2, grooves and optical fibers 3 on the substrate 1 to form a tight and sealed package so that the optical fibers 3 may transmit optical signals with desired quality without getting interference from outside light sources.

Referring to FIG. 3, this invention may also use surface micro machining technique. The surface of the substrate 1 is processed by surface micro machining to form a plurality of waveguides 8 in an array configuration. Every two adjacent waveguides 8 are laid in parallel. Every two opposite waveguides 8 are aligned along a linear line with a selected margin reserved between two opposite ends thereof. Then form a plurality of micro ball lenses 2 on the margin by the processes of lithography and heating processes set forth above. The micro ball lenses 2 and waveguides 8 are selectively positioned such that the center lines of the waveguides 8 will coincide with the centers of the micro ball lenses 2 to form exact alignments.

Figure 5:
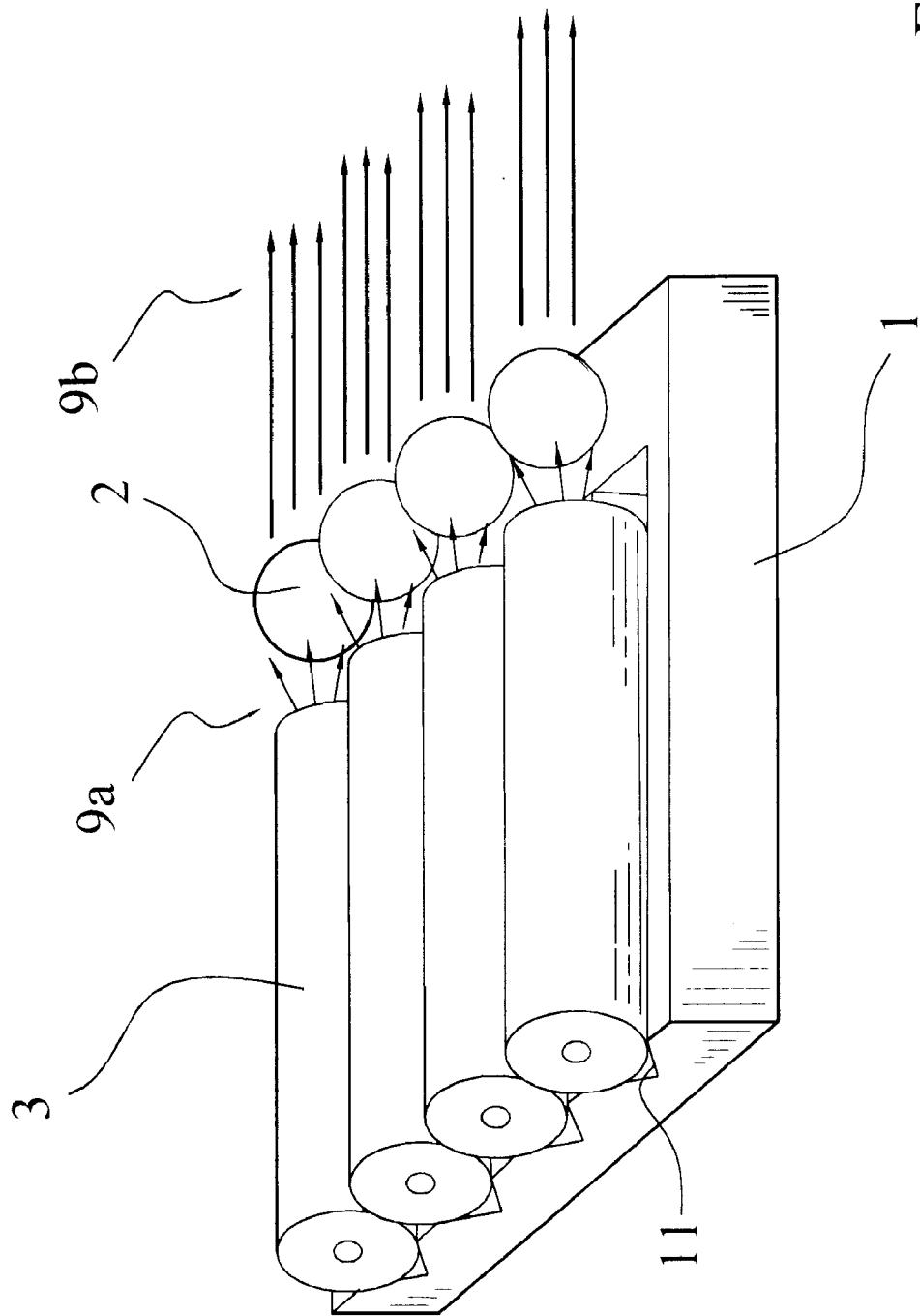
FIG. 5 is a schematic view of a third embodiment of this invention.

FIG. 4 shows another embodiment of this invention which couples the V-shaped grooves 11 with the waveguides 8. The micro ball lenses 2 become optical signal transmission elements between the optical fibers 3 and waveguides 8. FIGS. 5 and 6 show yet other embodiments of this invention which have the micro ball lenses 2 formed and located at one side of the V-shaped grooves 11 or waveguides 8 to receive scattering light 9a and transform to parallel light 9b.

The design and formation of the V-shaped grooves, waveguides and micro ball lenses set forth above adapt the conventional lithography process and heating process. The configuration of the V-shaped grooves, waveguides and micro ball lenses on the substrate may be prepared in advance without the need of micro assembly done by human labor. Alignment of the optical fibers may be done with high accuracy. Also through using the focusing characteristics of the micro ball lens, the insertion loss of optical signal transmission may be reduced to increase light converging efficiency. Furthermore, fabrication of the V-shaped grooves and micro ball lenses of this invention adapts the general lithography process and may be done in an integrated and batch process whereby to effectively shrink the size of the elements and increase the density of the micro ball lens. The fabrication process of this invention also may be adapted to an ordinary micro-optical bench system. The technique of using micro ball lenses to transform scattering light to parallel light may be adapted to a wide range of applications and helps to reduce production costs and time.

It may thus be seen that the objects of the present invention set forth herein, as well as those made apparent from the foregoing description, are efficiently attained. While the preferred embodiments of the invention have been set forth for purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An optical fiber alignment element using integrated micro ball lens, comprising:
   a substrate;
   a plurality of grooves formed on the substrate in an array fashion; at least one base pad disposed at a selected location between the grooves; and
   at least one micro ball lens formed on the surface of the base pad;
   wherein the base pad and integrated micro ball lens are formed between the arrayed grooves by lithography process and heating process.

2. The optical fiber alignment element of claim 1, wherein the substrate is made from silicon.

3. The optical fiber alignment element of claim 1, wherein each groove is formed in a V shape.

4. The optical fiber alignment element of claim 1, wherein the grooves are formed by processes which include lithography process and etching process.

5. The optical fiber alignment element of claim 1, wherein the base pad and micro ball lens are made from materials which have photoresist content, and the photoresist content of the micro ball lens has high transparency.

6. The optical fiber alignment element of claim 1, wherein the base pad is made from materials which include photosensitive polyimide, and the micro ball lens is made from materials which include high polymer polymethacrylate.

7. The optical fiber alignment element of claim 1, wherein the micro ball lens is made from materials which include high polymer polyacrylate.

8. The optical filter alignment element of claim 1 wherein the micro ball lens is made from a first polymer and the base pad is made from a second polymer which has a higher photo transparency and a lower glass transition temperature than the first polymer.

9. An optical fiber alignment element using integrated micro ball lens, comprising:

a substrate;

a plurality of waveguides formed on the substrate in an array fashion;

at least one base pad disposed at a selected location between the waveguides; and at least one micro ball lens formed on the surface of the base pad;

wherein the base pad and integrated micro ball lens are formed between the arrayed waveguides by lithography process and heating process.

10. The optical fiber alignment element of claim 9, wherein the substrate is made from silicon.

11. The optical fiber alignment element of claim 9, wherein the waveguides are formed by micro machining.

12. The optical fiber alignment element of claim 9, wherein the base pad and micro ball lens are made from materials which have photoresist content, and the photoresist content of the micro ball lens has high transparency.

13. The optical fiber alignment element of claim 9, wherein the base pad is made from materials which include photosensitive polyimide, and the micro ball lens is made from materials which include high polymer polymethacrylate.

14. The optical fiber alignment element of claim 9, wherein the micro ball lens is made from materials which include high polymer polyacrylate.

15. The optical filter alignment element of claim 9 wherein the micro ball lens is made from a first polymer and the base pad is made from a second polymer which has a higher photo transparency and a lower glass transition temperature than the first polymer.

16. An optical fiber alignment element using integrated micro ball lens, comprising:

a substrate;

a plurality of waveguides and V-shaped grooves formed on the substrate in an array fashion;

at least one base pad disposed at a selected location between the waveguides and V-shaped grooves; and at least one micro ball lens formed on the surface of the base pad;

wherein the base pad and integrated micro ball lens are formed between the arrayed grooves and waveguides by lithography process and heating process.

17. The optical fiber alignment element of claim 16, wherein the substrate is made from silicon.

18. The optical fiber alignment element of claim 16, wherein the V-shaped grooves are formed by processes which include lithography process and etching process.

19. The optical fiber alignment element of claim 16, wherein the waveguides are formed by micro machining.

20. The optical fiber alignment element of claim 16, wherein the base pad and micro ball lens are made from materials which have photoresist content, and the photoresist content of the micro ball lens has high transparency.

21. The optical fiber alignment element of claim 16, wherein the base pad is made from materials which include photosensitive polyimide, and the micro ball lens is made from materials which include high polymer polymethacrylate.

22. The optical fiber alignment element of claim 16, wherein the micro ball lens is made from materials which include high polymer polyacrylate.

23. The optical filter alignment element of claim 16 wherein the micro ball lens is made from a first polymer and the base pad is made from a second polymer which has a higher photo transparency and a lower glass transition temperature than the first polymer.

* * * * *